United States Patent
Langridge et al.

(10) Patent No.: US 6,325,172 B1
(45) Date of Patent: Dec. 4, 2001

(54) GEOPHONE INCLUDING LASER INTERFEROMETER

(75) Inventors: William Langridge, Radnor, PA (US); Stephen R. Mynes; Steven D. Breed, both of Austin, TX (US)

(73) Assignee: PVT-WRL, LLC, Wilmington, DE (US)

( * ) Notice: Subject to any disclaimer, the term of this patent is extended or adjusted under 35 U.S.C. 154(b) by 0 days.

(21) Appl. No.: 09/578,871

(22) Filed: May 25, 2000

(51) Int. Cl.[7] .............................. G01V 1/16; G01V 13/00; G01P 3/36

(52) U.S. Cl. ........................ 181/122; 73/1.85; 356/28.5; 367/151

(58) Field of Search ............................ 181/122, 108–112; 73/1.85, 653, 655; 367/13, 149, 150, 151; 250/230; 385/12, 14; 356/28.5, 496, 502, 486

(56) References Cited

U.S. PATENT DOCUMENTS

| | | |
|---|---|---|
| 3,693,400 * | 9/1972 | Savit ................................. 73/1.85 |
| 4,284,350 | 8/1981 | Coon et al. . |
| 4,322,829 | 3/1982 | Davis, Jr. et al. . |
| 4,500,979 | 2/1985 | Scott . |
| 4,619,529 | 10/1986 | Iuchi et al. . |
| 4,768,381 | 9/1988 | Sugimoto . |
| 4,792,931 * | 12/1988 | Nishida et al. ..................... 367/149 |
| 4,892,406 | 1/1990 | Waters . |
| 5,351,122 | 9/1994 | Niebaer et al. . |
| 5,495,767 | 3/1996 | Wang et al. . |
| 5,497,233 | 3/1996 | Meyer . |

* cited by examiner

*Primary Examiner*—Khanh Dang
(74) *Attorney, Agent, or Firm*—Baker Botts L.L.P.

(57) ABSTRACT

An interferometric geophone includes a freely-falling reference mass and an interferometric arrangement to measure motion of a surface to which the geophone is attached. The mass may fall through an evacuated chamber. A carriage arrangement may reposition the reference mass for another fall. The reference mass has top and bottom retro-reflectors. The interferometric arrangement includes a laser and a beam-splitter that divides the laser beam into two beams directed toward the top and bottom of the reference mass by partially reflecting surfaces on prisms or mirrors. When the beam encounters the first face of each prism or a first mirror it is split again. One of the split beams is directed toward the falling retro-reflector; the other beam passes through the prism or mirror and encounters the second face. The retro-reflector returns the first split-beam to the second face via a lens arrangement. At both top and bottom, the beam transiting the prism or mirrors and the beam returning from the retro-reflectors re-combine at the face of a detector where the two interference patterns generated at recombination are registered and undergo subsequent signal processing.

19 Claims, 6 Drawing Sheets

GEOPHONE INCLUDING LASER INTERFEROMETER

FIELD OF THE INVENTION

The present invention generally relates to the measurement of seismic waves. More particularly, a geophone employing an interferometer and a free-falling reflective mass is disclosed.

BACKGROUND OF THE INVENTION

Devices for measuring the earth's surface vibration are known as "geophones." A geophone may be considered a special application of devices used for measuring vibration, which are sometimes called "vibrometers." Movement that is not vibration may also be measured by such devices. The word "geophone" used herein will be understood to include an instrument used for measuring movement or vibration of a surface.

Geophones are used for seismic exploration both on land and under water. They are contained in a case that contacts the surface of the earth and usually connects to electrical cables. The principle of the conventional geophone is very simple: a coil of electrical wire is suspended from a spring in the center of permanent magnets. The mass of the coil, suspended from the spring, tends to remain stationary when the case moves up and down. This causes the electrical coil to move through the magnetic field of the permanent magnets and induces small electrical currents in the coil. Electrical voltage produced is proportional to the velocity of motion. The voltage is recorded in a computer memory or other memory device for later analysis. Geophones based on this principle have been plagued by limited data quality. The quality of the data gathered has been limited because the reference body is not fully de-coupled from the vibration; it is weakly coupled to the apparatus by the spring. Therefore, the reference body is influenced by the motion that is to be measured, which complicates analysis of the measured data. The response of the reference to the surface motion must compensated for.

Resonant frequency is one of the important characteristics of a conventional geophone. Lower resonant frequency is desired but is more difficult to achieve. Conventional geophones commonly have a resonant frequency in the range from 1 Hz to about 10 Hz.

The response of a conventional geophone is measured in volts per g of acceleration and varies with frequency of the movement. Sensitivity is limited by the noise of the electronics and the low frequency response (less than 5 Hz) is inadequate for many applications. Geophones for use in seismic exploration should have low distortion, large dynamic range, be insensitive to off-axis inputs, survive shock inputs of greater than 10,000 g's with no effect on performance and have a wide operating temperature range.

Seismometers using either mass velocity or displacement feedback have been described in the literature and are manufactured by various companies. The newer micromachined accelerometers are generally robust, but are typically expensive and do not offer equivalent performance. The sensitivity of geophones that are commonly available depends on whether a closed loop or open loop method of measurement is used, but commonly is in the range of a few volts per g. In the closed loop configuration, sensitivity can be fairly flat from less than 1 Hz to about 100 Hz. Sensitivity above about 100 Hz drops rapidly. The spring and mass system is often tuned to a resonant frequency of about 7 Hz in conventional geophones. Because of a low spring constant, a large amount of damping must be applied to the system. The damping causes loss of signal. The lower sensitivity leads to loss of bandwidth.

Because of the accuracy limitations of current geophone technology, the required accuracy is achieved in the field by connecting several geophones in series. Each such grouping of geophones is called a string. For analysis purposes, each string is taken to approximate a point measurement despite the fact that the string is, in reality, an extended body.

A laser geophone was disclosed in U.S. Pat. No. 4,284, 350. The method involves directing a light beam from a laser to a location, reflecting the beam from a reflector that moves with surface motion of the earth at that location and also, at that location, reflecting the beam from a reflector that is partially isolated from motion of the earth by a spring. Movement of the reflectors is measured by the Doppler shift of frequency.

A laser interferometer for use in a geophone was disclosed in U.S. Pat. No. 4,500,979. A mass that is suspended by a spring has top and bottom reflectors that reflect a beam that is combined with a reference beam from the laser to produce interference fringe patterns in response to movement of the mass. Counting of fringes and fractions of fringes in a unit of time is used to measure velocity of the mass.

While improvements in conventional geophone apparatus have occurred steadily for many years, the sensitivity and frequency response of such geophones are limited. To obtain a transducer having properties not limited by the prior art mechanisms, a different principle for measuring motion or velocity is needed. The technique should allow for measuring small displacements independent of frequency over a broad range of frequencies. Importantly, coupling between the earth's surface and a reference body should be eliminated.

SUMMARY OF THE INVENTION

Apparatus and method for measuring vibration or movement of a surface are provided using the principle of measuring interference fringes produced by a two-beam interferometer with one beam reflecting from a falling mass and a second beam reflecting from a surface attached to a vibrating surface. The falling mass is contained in a chamber, which may be evacuated, along with a mechanism to raise the mass to top of the chamber and arrest its fall at the bottom of the chamber. In one embodiment, the free-space interferometric geophone employs an optical laser as a source, a pair of beam-splitting and recombining prisms and four photodiodes as detectors. A plurality of such geophones, controlled such that each geophone records sequentially, may be placed at a location for measuring a seismic event that extends over a longer time than the falling time of the mass. Different types of interferometers may be used, along with a laser light source. The geophone may be attached to any vibrating or moving surface.

A photodiode senses the interference fringes produced by the interferometer. The electrical signal from the photodiode is processed to remove the linear frequency sweep caused by the reflector's fall under gravity. The resulting, processed signal is analyzed for vibration information.

DESCRIPTION OF THE FIGURES

For a more complete understanding of the invention and the advantages thereof, reference is now made to the following description taken in conjunction with the following drawings in which like reference numbers indicate like features and wherein.

DESCRIPTION OF THE PREFERRED EMBODIMENTS

Figure 1:
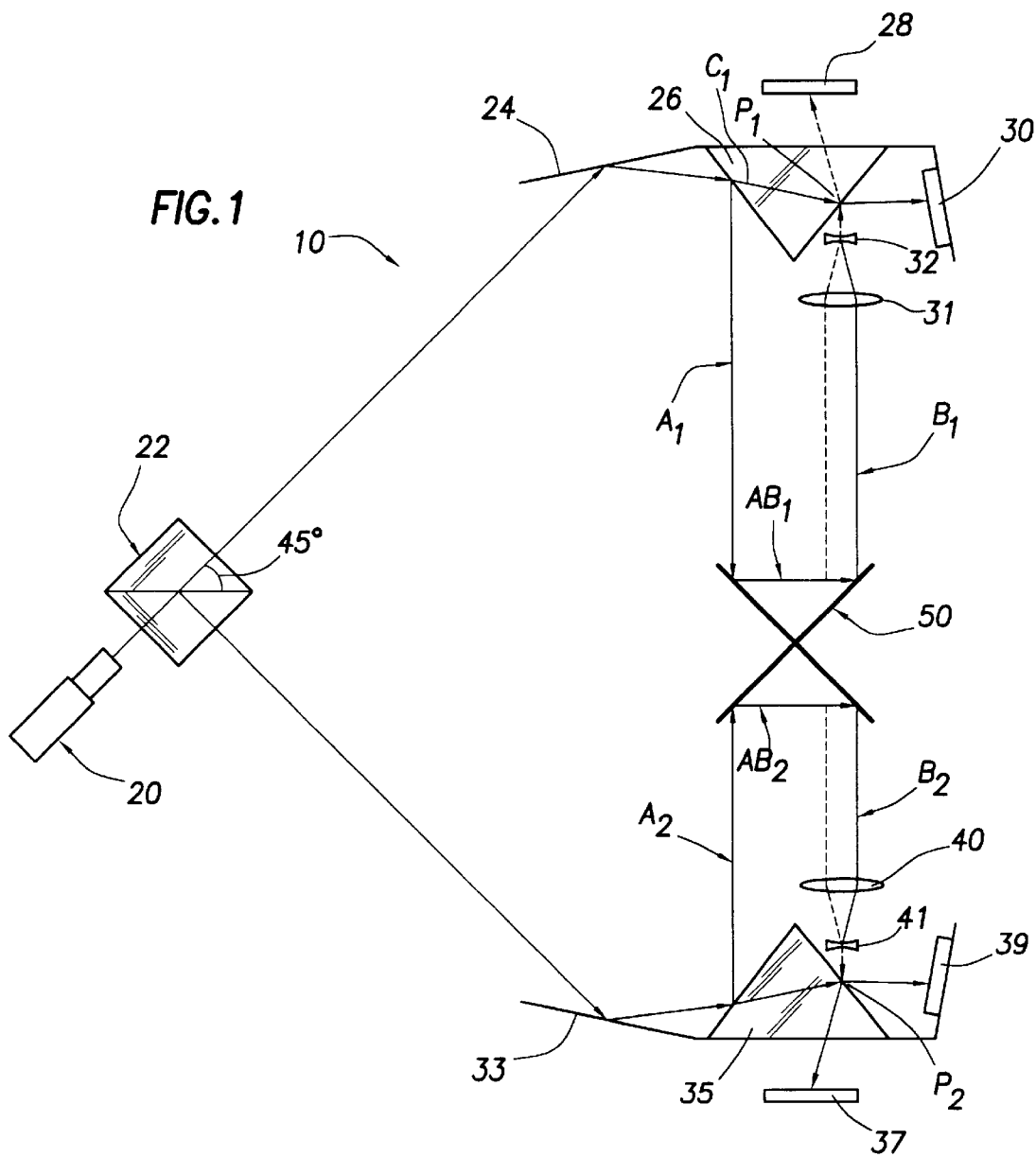
FIG. 1 is a sketch of ray paths when reflected light from a falling mass having trihedra reflectors and from a vibration probe aligned in the vertical direction are combined to produce interference fringes using prisms.

Referring to FIG. 1, ray paths (lines with arrows) in one embodiment of geophone 10 are shown. (The term "geophone" as used herein means any device used for measuring vibration or movement of a surface.) Laser assembly 20 provides a beam directed at beam-splitter 22 and directed at an angle of 45 degrees with respect to the vertical axis of geophone 10. Beam-splitter 22 splits the beam into two beams that are directed toward the top and bottom optical components of the apparatus. At both the top and bottom, the beam is reflected by mirrors 24 and 33, respectively, to prisms 26 and 35. Mirrors 24 and 33 are preferably totally reflective. The left surface of prisms 26 and 35 is half-silvered such that part of the ray's energy is reflected toward mass 50 that includes retro-reflectors on top and bottom. Therefore, beam $A_1$ is reflected back as beam $B_1$ by way of beam $AB_1$ and $A_2$ is similarly reflected back as beam $B_2$. Returning beams $B_1$ and $B_2$ are directed through converging lenses 31 and 40 and diverging lenses 32 and 41, respectively, and brought to points $P_1$ and $P_2$, where they again are partially reflected and join with beams that were transmitted though prisms 26 and 35. The diverging lenses are preferably placed at the focal point of the converging lenses so as to collimate the light beam before it strikes the second surfaces of the prisms. Combined beams from the top and bottom of falling mass 50 then fall on detectors 30 and 39, respectively. Second combined beams may also be directed to detectors 28 and 37. Use of additional detectors 28 and 37 increases sensitivity of the apparatus and improves signal-to-noise ratio of the signals.

Figure 2:
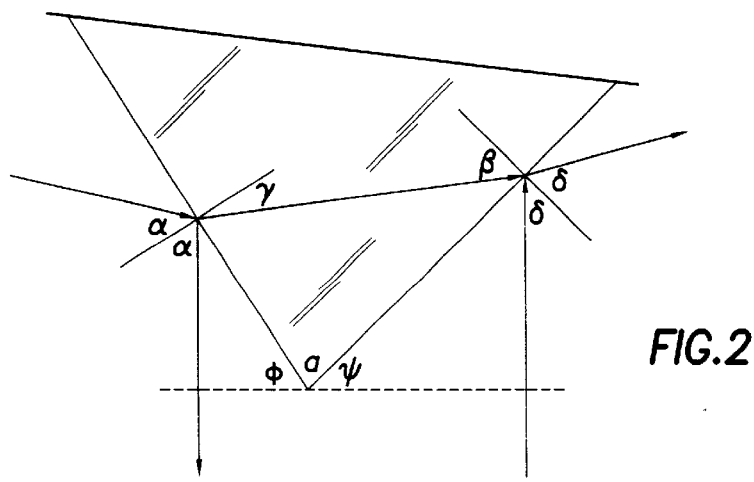
FIG. 2 is a sketch of ray paths through a prism of the geophone producing ray paths as shown in FIG. 1.

FIG. 2 shows ray paths through one of the prisms, such as prism 26. The vertex angles and the incline of the prism must be chosen so that the rays will converge to the detectors as described above. Referring to FIG. 2, let $\alpha$ denote the angle of incidence of the incoming ray when it encounters the left face of the prism and $\gamma$ denote the angle of refraction of the same ray. Likewise, on the right prism face, let $\beta$ denote the angle the ray transiting the prism makes as it encounters the right face and let $\delta$ denote the angle the exiting ray makes as it leaves the face. The prism's vertex angle is denoted by a. Also, let the incline of the left face of the prism from the horizontal be $\phi$ and the inclination of the right face be $\psi$.

The first conditions the angles must satisfy are purely geometric:

$$\beta+\gamma=a$$

$$\phi+a+\psi=180$$

Since Snell's law applies at each interface (n denotes the refractive index of the prism), $$n \sin \beta = \sin \delta,$$

$$n \sin \gamma = \sin \alpha.$$

Lastly, the rays must meet two design requirements. When the incoming ray is incident upon the left face, the reflected ray generated must be vertical so that it may travel to the reflector. Geometry and the law of reflection then require, $$\alpha=\phi.$$

Likewise, a ray returning from the reflector and arriving at the right prism face in a vertical orientation will be required to reflect from the right face at the same angle as the exiting transit ray. Geometry and the law of reflection then also require, $$\delta=\psi.$$

Therefore, the second of the purely geometrical equations above becomes $$\phi+a+\delta=180.$$

Given these relations, Snell's Law for the right prism face becomes $$n \sin(a-\gamma)=\sin[180-(\phi+a)]=\sin(\phi+a)$$

Applying the angle sum formula and rearranging the resulting terms yields $$\sin a(n \cos \gamma - \cos \phi)=\cos a(\sin \phi + n \sin \gamma).$$

References to the angle $\gamma$ are removed via Snell's law for the left face, leaving $$\sin a(\sqrt{n^2-\sin^2\phi}-\cos \phi)=2 \cos a \sin \phi.$$

Therefore, the prism vertex angle and the incline of the right face are related by the above equation. It displays the freedom allowed in designing and orienting the prism and can be solved analytically for either angle. Once a choice of either angle is made, the other can be determined, and from there all other angles in the problem can be calculated from the earlier relations.

All segments of the optical paths are of fixed length except for segments $A_i$, $B_i$ and $AB_i$ (where i is 1 or 2). These segments vary in length over time due to three effects:

1. the fall of the reflector under gravity,
2. the motion the rest of the apparatus undergoes because of its coupling to the moving surface, and
3. the rotation of the reflector (relative to the rest of the apparatus) during its fall.

Effect 3 will have no impact as long as the interior angles of the reflector are 90 degrees. That is the case because, due to the nature of retro-reflectors, the overall length $A_i+AB_i+B_i$ does not change during reflector rotation. Therefore, effect 3 is inconsequential to the functioning of the device unless the reflector has lost some internal alignment. Such loss is to be expected in a physical apparatus, however, so a means of negating effect 3 is needed. The signal processing section below describes how the rotation effects are removed by use of the optical paths at both ends of the device.

When the beam traversing the path $A_i+AB_i+B_i$ interferes with the non-varying beam $C_i$ (i=1 or 2), the amplitude of the interference produced will constitute the data signal seen at detectors 30 and 28. The data signal observed at each detector will depend upon effects 1 through 3. However, only effect 2 carries the message frequency; effects 1 and 3 are corrupting influences. Effect 1, because of constant acceleration under gravity, will produce a linear sweep in the interference frequency at the detectors. Effect 3, if the reflector deformation is slight, will produce only low frequencies. Lateral motion caused by effect 2 carries information about lateral components of the vibration by the earth's surface.

Figure 3:
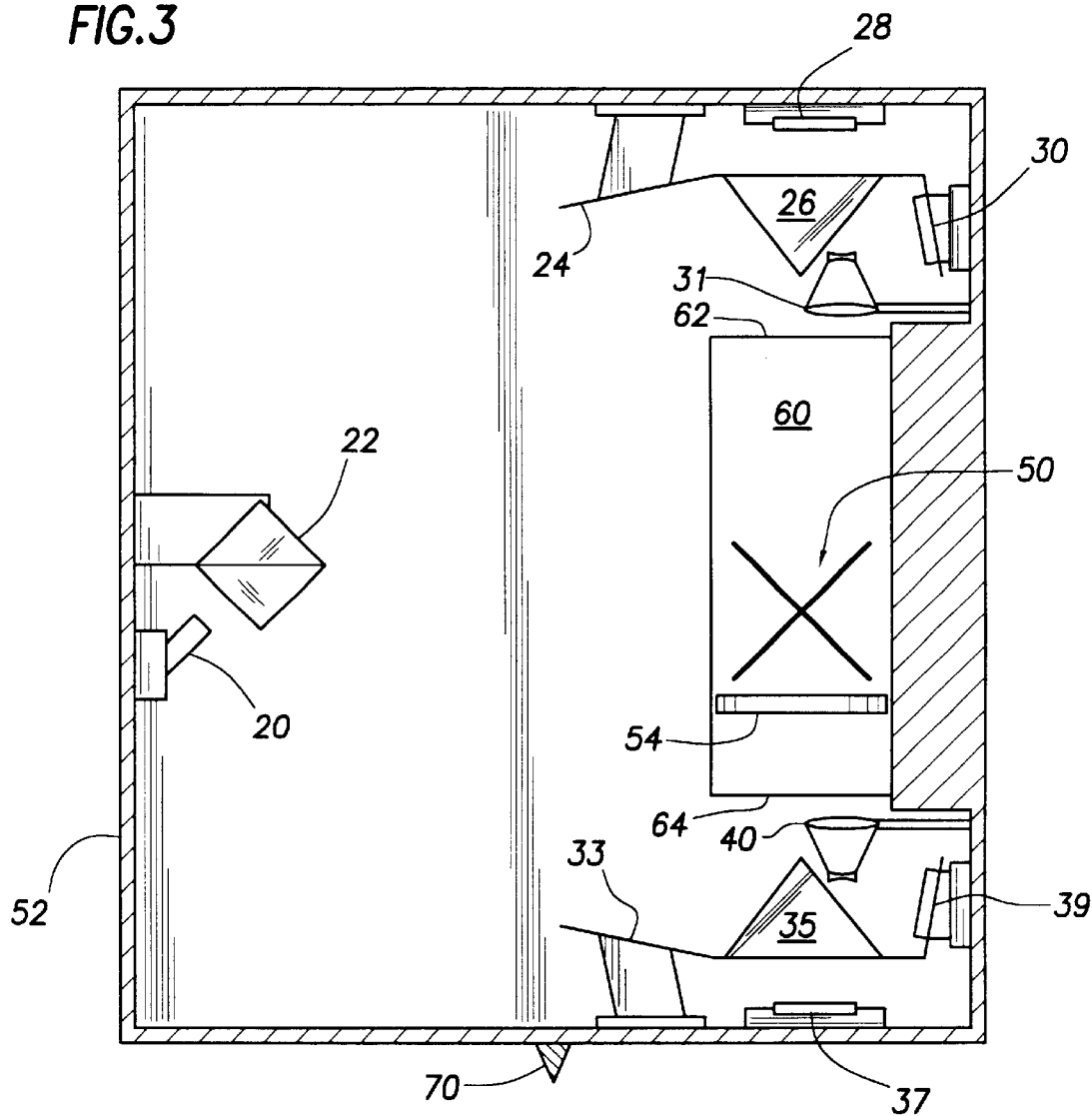
FIG. 3 is a drawing of a mechanical arrangement of one embodiment of the geophone producing ray paths as shown in FIG. 1.

Referring to FIG. 3, free-fall mass 50, the reference body and a trihedral retro-reflector, is shown at a position during free-fall. Prior to release for falling, mass 50 is at rest at the top of chamber 60 and is supported by carriage 54. Carriage 54 has been moved down rapidly, allowing mass 50 to be in gravitational free-fall, as will be more fully explained below. Chamber 60 may be evacuated and is preferably cylindrical in cross-section. In one embodiment, the cylinder is preferably enclosed within a solenoid (not shown). Carriage 54 is ring-shaped and its outside diameter may closely match the inside diameter of chamber 60. Transparent windows 62 and 64 are at each end of chamber 60. Case 52 enclose the entire optical and mechanical apparatus. Spike 70 is adapted for attaching case 52 to a vibrating or moving surface, such as the surface of the earth.

Figure 4A:
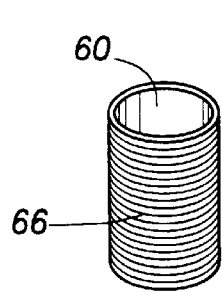
FIGS. 4(a), 4(b) and 4(c) are drawings of one embodiment of apparatus for moving and controlling the free-fall of a mass used in the apparatus.
Figure 4B:
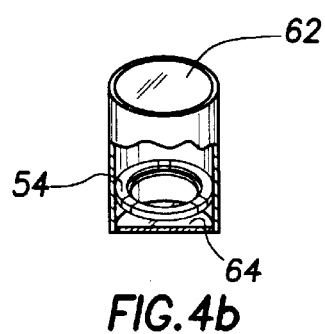
Figure 4C:
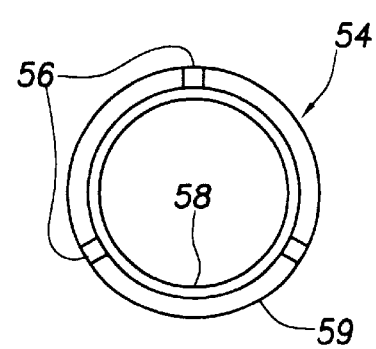

FIG. 4(a) shows details of a solenoid that may surround chamber 60. Wires 66 are wound to produce a uniform field over a working distance within chamber 60 for moving carriage 54 upward and downward. FIG. 4(b) shows carriage 54 within chamber 60 with transparent windows 62 and 64 at each end of the cylinder. FIG. 4(c) shows details of carriage 54. Mounted at 120 degree intervals around the circumference of carriage 54 are three strong, permanent magnets 56. When current is passed through solenoid wires 66, the magnets will drive the carriage upward or downward (according to the current direction) within chamber 60. Prior to a drop, both mass 50 and carriage 54 are at or near the top of chamber 60; mass 50 rests on inner lip 58 of carriage 54. Outer ring 59 of carriage 54 may be adapted to fit closely the inside diameter of chamber 60. A current in solenoid wires 66 sufficient to offset gravity will maintain mass 50 and carriage 54 at approximate rest until drop-time. At drop, a small solenoid current in the opposite direction will drive carriage 54 downward ahead of mass 50. Once mass 50 separates from carriage 54, mass 50 will enter free-fall. During most of the fall, carriage 54 will lie a few millimeters ahead of mass 50. Near the termination point of the fall, time-varying application of current to solenoid wires 66 will bring mass 50 gradually to rest, allowing mass 50 to impact softly on inner lip 58 of carriage 54 and to be brought to rest. Then, in order to re-position mass 50 for another fall, an increase in the current will carry mass 50 and carriage 54 back to the top again. Current in the solenoid is controlled by an external controller.

Alternatively, other mass dropping and raising systems may be used for this geophone. For example, a mechanical cart as disclosed in U.S. Pat. No. 5,351,122, which is incorporated by reference herein for all purposes, may be used. Another example of a mechanical raising and lowering system would employ a stepper motor during the carriage reset.

Retro-reflector mass 50 is preferably formed from a nonmagnetic material, such as coated Mylar. It may be either a good electrical conductor or an insulator. An alternative embodiment of the device could have a heavier retro-reflector falling not through vacuum, but through air at atmospheric pressure. Since the reflector is now heavy and the fall distance is fairly short (about 3 inches, for example), the atmospheric impediment to the fall is acceptably small, and vacuum conditions are unnecessary.

Photodetectors 28, 30, 37 and 39 may be avalanche photodiodes or other devices known in the art. Photodetectors may also be a biased silicon detector available from Edmund Scientific Company of Barrington, N.J. Interference fringes detected by the photodetectors may be converted to continuous wave electrical signals. Signal outputs from photodetectors may be processed as described below.

Laser assembly 20 may include a solid state diode emitting at 670 nm, but other lasers or light sources may be used. A spatial filter preferably is inserted on the output of a laser to clean up angular distribution of the laser output, i.e., to eliminate the side lobes. This may be accomplished by passing the laser beam through an objective lens and focusing the beam on a hole of about 10 microns in diameter and then recollimating the beam with a second lens. The beam splitter may be any of several known beam splitters, including plate beam splitters, cube beam splitters and others providing that one portion of a light beam is transmitted while another portion is reflected. Such beam splitters are readily available from sources of optical equipment. Conventional reflectors or mirrors may be used, such as square flat mirrors, spherical concave mirrors and cornercube retro-reflectors.

The time for recording vibration during a drop of the mass depends on the vertical dimension of chamber 16. For example, for a drop of 1 foot, the time for recording is 0.25 second. For a drop of 16 feet, the time for recording is 1 second. The diameter of chamber 60 may vary over a wide range, from a few millimeters to a few centimeters.

Rotary polarizers may be used in one or both of the two channels of light to obtain amplitude and polar vectors of the reference beam and the instrumentation beam equalized when the beams hit the detector. This may be accomplished by two sheets of polarizing material in each channel. It is anticipated that recording of seismic signals may require a plurality of detectors in proximity and controlled to drop the mass in each geophone sequentially. Output of the geophones is then combined to produce a complete record of a seismic event.

Frame 52 (FIG. 3) supports the mass-dropping system and the interferometer system described above. Frame 52 may include a leveling mechanism that can be used to cause mass 50 to fall in a vertical path.

Figure 5:
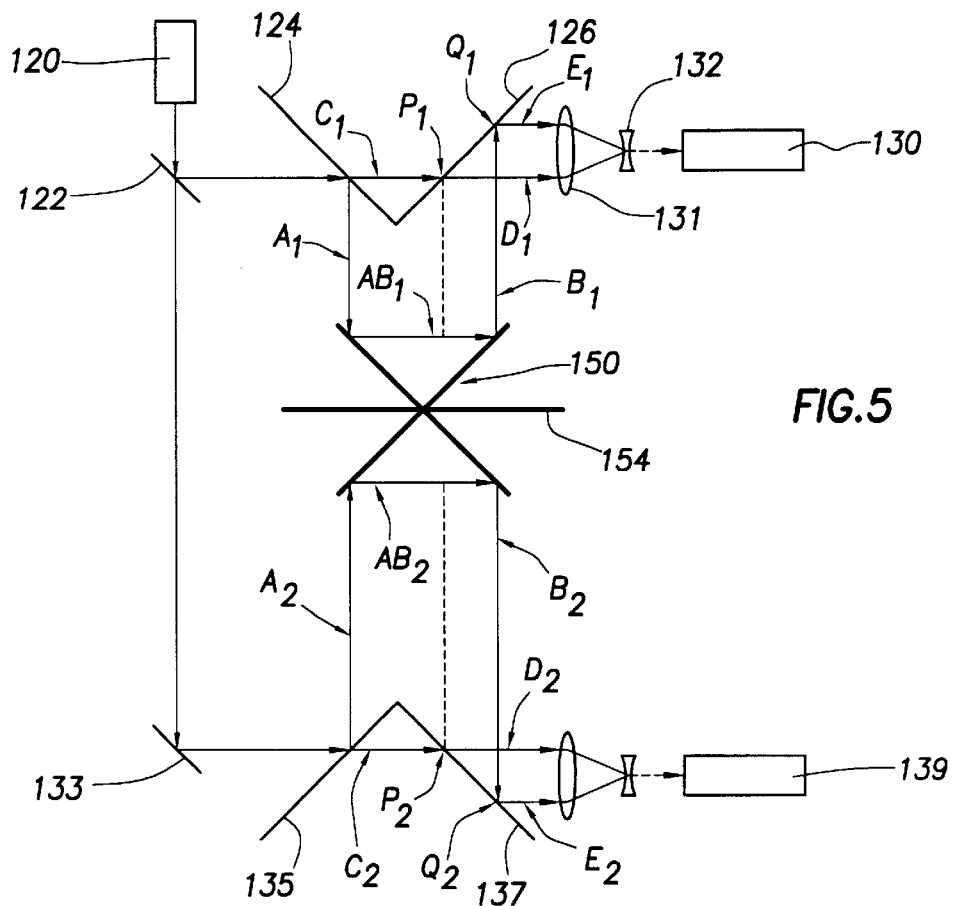
FIG. 5 is a sketch of ray paths when reflected light from a falling mass having trihedra reflectors and from a vibration probe aligned in the vertical direction are combined to produce interference fringes using mirrors.

Other means of splitting and recombining the beams are possible without use of prisms as described above. Half-silvered mirrors can be used, for example, and other devices are possible. FIG. 5 illustrates ray paths with use of mirrors. All of the optics, including sources, detectors, and optical surfaces may be located within a chamber, which may be evacuated. Mass 150, the reference body; is a trihedral retro-reflector. Prior to release, mass 150 is latched at the top of the chamber. Once released, mass 150 is in gravitational free-fall. Latching bar 154, passes through the vertex and center of mass of mass 150. When the reflector impacts the bottom of the device following its period of free-fall, the latching bar absorbs the impact. No other part of the reflector participates in the impact. Since the bar passes through the vertex and center of mass of the reflector, the reflector is only minimally deformed by impact stresses.

As shown in FIG. 5, the device may possess identical optical components mounted at both top and bottom. Alternatively, optical components could be used at either the bottom or top. The optical source is laser assembly 120, with its beam directed vertically downward. The beam is split at beam-splitter 122 into portions directed toward the top and bottom optical components. Each set of components consists of a pair of 50%-silvered mirrors angled at 45 degrees to vertical. As drawn, the ray arriving from the laser is incident upon the left mirror. At that mirror, part of the ray's energy is reflected toward falling reflector 150. That is the ray $A_i$. The remainder of the energy is transmitted through the mirror and transits the space between the mirrors along ray $C_i$. The ray $C_i$ will reach the second 50%-silvered mirror at point $P_i$. Meanwhile, ray $A_i$ reaches the reflector, transits within the reflector along one or more rays represented as $AB_i$, and returns along ray $B_i$. Ray $B_i$ also intersects the second mirror. This intersection point is labeled $Q_i$. In general, points $P_i$ and $Q_i$ do not coincide. Part of the energy in ray $C_i$ is transmitted through the 50%-silvered mirror and emerges along ray $D_i$ as shown. Likewise, part of the energy in ray $B_i$ is reflected at the mirror and subsequently follows ray $E_i$. A lens such as lens 131 is placed in the path of rays $D_i$ and $E_i$, causing them to converge. A second lens, 132, is placed at the focal point of lens 131 to provide collimation. The collimated beam then enters detector 130 and detector 139. All segments of the optical paths are of fixed length except for segments $A_i$, $B_i$, $AB_i$, and $E_i$. These segments vary in length over time due to three effects:

1. the fall of the reflector under gravity,
2. the motion the rest of the apparatus undergoes because of its coupling to the moving earth, and
3. the rotation of the reflector (relative to the rest of the apparatus) during its fall.

Effect 3 will have no impact as long as the interior angles of the reflector are 90 degrees. That is the case because, due to the nature of retro-reflectors, the overall length $A_i+AB_i+B_i$ does not change during reflector rotation. Therefore, effect 3 is inconsequential to the functioning of the device unless the reflector has lost some internal alignment. Such loss is to be expected in a physical apparatus, however, so a means of negating effect 3 is needed. The signal processing section below describes how the rotation effects are removed by use of the optical paths at both ends of the device.

Segment $E_i$ varies when there is a lateral component to effect 1 or 2. However, lateral motion is a neutral effect because it produces no change in the combined length $B_i+E_i$ which is the physically relevant length since it connects the reflector to the detector. Any change induced in $B_i$ by lateral motion is compensated for by an opposite change in $E_i$. When the beam traversing the path $A_i+AB_i+B_i+E_i$ interferes with the non-varying beam $C_i+D_i$, the amplitude of the interference produced will constitute the data signal. The data signal observed at each detector will depend upon effects 1 through 3. However, only effect 2 carries the message frequency; effects 1 and 3 are corrupting influences. Effect 1, because it is constant acceleration under gravity, will produce a linear sweep in the interference frequency at the detectors. Effect 3, if the reflector deformation is slight, will produce only low frequencies.

Figure 6:
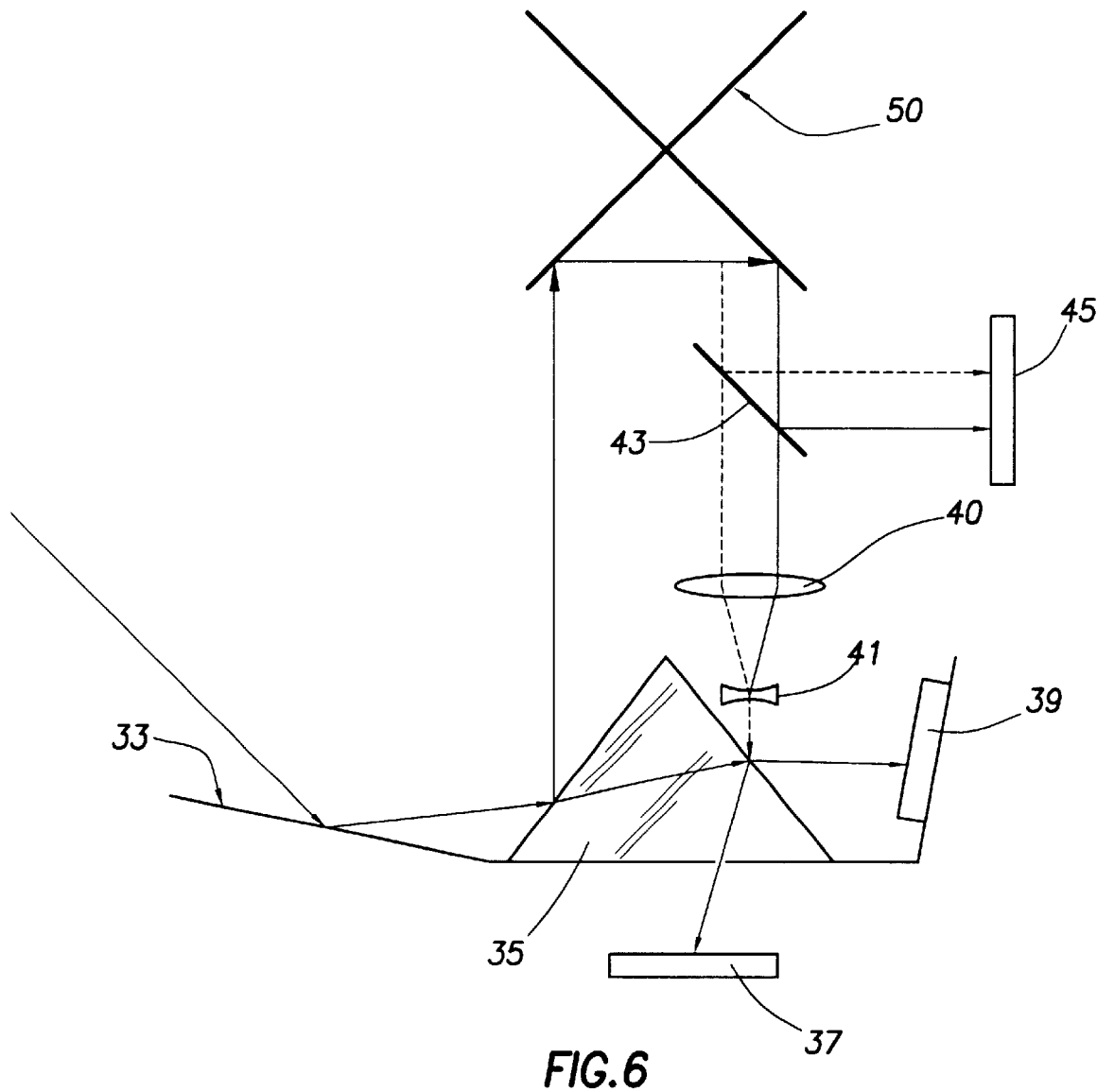
FIG. 6 is a sketch of ray paths when reflected light from a falling mass having trihedral reflectors and from a vibration probe that transmits motion in the transverse direction are combined on a two-dimensional array of photodiodes.

A reflective falling mass and laser may also be used to measure vibration in a plane normal to the direction of the falling mass. The ray paths of suitable apparatus is shown in FIG. 6. An incoming ray is reflected by mirror 33 to prism 35, just as shown in FIG. 1 for the lower beam. Either the top or lower or both laser paths may be used. This arrangement permits measurement of motion transverse to the laser beam. Motion in the transverse direction causes the laser beam to sweep laterally across lens 40. (The negation of that effect is, in fact, the reason that lenses 40 and 31 are included in the design of FIG. 1.) The sweep effect carries information about the transverse motion of reflector 50 relative to the rest of the apparatus. The insertion of beam-splitter 43 ahead of lens 40 directs a portion of the laser beam toward photodiode array 45. The other portion is allowed to continue as before toward lens 40. When the redirected portion is incident on photodiode array 45, the point of incidence is registered by the array. Those photodiodes directly in the beam's path will register a greater response than the others. Various algorithms (such as centroid calculations) can be employed to compute a point of incidence from the response data.

Still referring to FIG. 6, a rightward shift of falling reflector 50 will cause a downward shift in the position at which the redirected beam will hit photodiode array 45. Likewise, a leftward shift will cause an upward displacement of the redirected beam. A reflector shift out of the page will cause the redirected beam to shift out of the page as well. Likewise, a reflector shift into the page will cause a shift of the redirected beam into the page.

Figure 7:
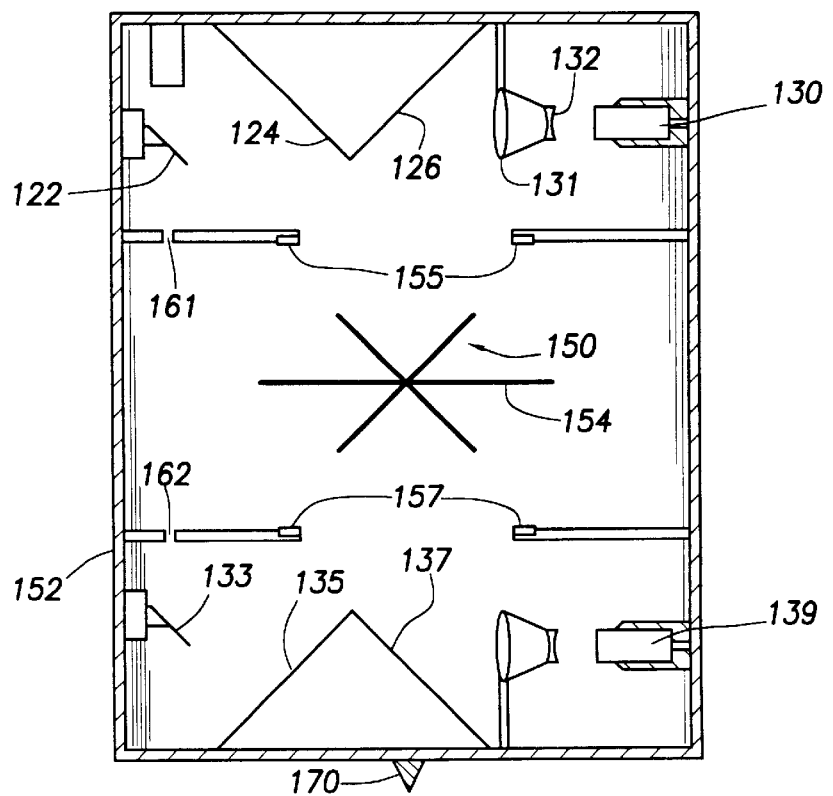
FIG. 7 is a drawing of a mechanical arrangement of one embodiment of the geophone producing ray paths as shown in FIG. 5.

FIG. 7 shows mechanical details of the device for which FIG. 5 shows ray paths. Case 152 bounds an enclosure that may be evacuated. All optical and mechanical components are preferably within the enclosure. Shown are the optical components described in FIG. 5, along with their respective mountings. Also shown is latching bar 154 across the center of falling mass 150 that has reflective surfaces. Prior to release of mass 150, latching bar 154 is held against upper latching mounts by electromagnets 155. At the time of release, the current to the electromagnets is turned off, allowing the reflector to fall. The fall continues until latching bar 154 encounters lower electromagnetic latches 157. To preserve the free-fall status of the falling reflector, the lower electromagnets are turned off until just before the reflector reaches them. When they are then turned on, they serve to prevent the reflector from bouncing. Apertures 161 and 162 are placed so as to allow passage of the light beam from top mirror 122 to bottom mirror 133. Top mirror 122 reflects about half the light incident on its surface and transmits about half. Bottom mirror 133 is totally reflecting. Lens arrangements are shown in FIGS. 5 and 7. The fall sequence can be repeated indefinitely by inverting the entire device, when all of the apparatus shown in FIGS. 5 and 7 is turned upside down. The lower electromagnets then become the upper ones, and the free-fall sequence is repeated. If desired, a second detector may be added at both top and bottom (as in FIGS. 2 and 3) to recover light energy lost at the right beam-splitter. A factor-of-two enhancement may be achieved by doing so.

Figure 8:
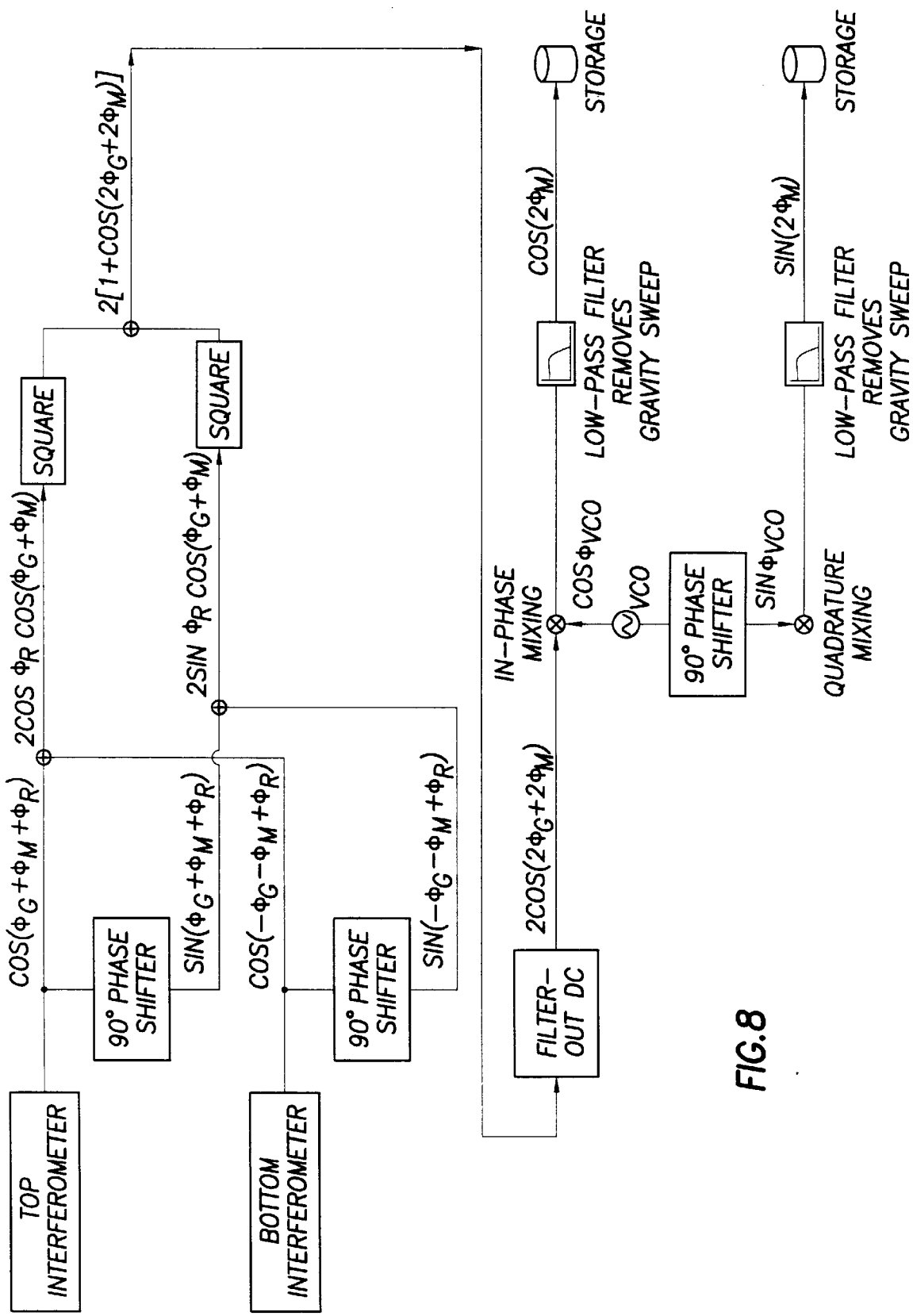
FIG. 8 shows a chart of a preferred implementation of signal processing for the geophone using prisms as illustrated in FIG. 1.

A preferred implementation of signal processing the data from the geophone is illustrated in FIG. 8 for geophones containing both top and bottom optical components. The data processor uses the following technique to separate the rotation component from the gravity sweep and the message components. Let $\cos \Phi^T(t)$ and $\cos \Phi^B(t)$ represent the data signals from the top and bottom interferometric apparatus, respectively. Because of symmetry, the signals at both top detectors (detectors 28 and 30 of FIG. 1, for example) will be identical, as will those at both bottom detectors. If the top detector signals are added together and the bottom detector signals are added together, then a factor-of-two enhancement in signal strength can be achieved in each.

The top and bottom phases are $$\Phi^T(t)=\Phi_G(t)+\Phi_M(t)+\Phi_R(t)$$

$$\Phi^B(t)=-\Phi_G(t)-\Phi_M(t)+\Phi_R(t),$$

where $\Phi_G$ is the phase or component of the data signal due to the gravity sweep, $\Phi_M$ is the phase due to the message, and $\Phi_R$ is the phase due to rotation of the reflector. Initial phases, since they are non-varying (time-independent) have been omitted. In using the same rotation contribution, $\Phi_R$, in both equations it has been assumed that the deformation of the reflector is symmetric, i.e., that the deformation of the cavity on the top side of the reflector is identical to that of the bottom side.

The preferred implementation first forms in-phase and quadrature components of both the top and bottom data signals:

In-phase, top=$\cos \Phi^T(t)$

Quadrature, top=$\sin \Phi^T(t)$

In-phase, bottom=$\cos \Phi^B(t)$

Quadrature, bottom=$\sin \Phi^B(t)$

In order to remove the possible rotation component, sum channels are formed from the inphase and quadrature components of the top data signal and the bottom data signal:

$$\Sigma_I=\cos \Phi^T+\cos \Phi^B,$$

$$\Sigma_Q=\sin \Phi^T+\sin \Phi^B.$$

Now, applying trigonometric identities to the sum channel and using the formulae for top and bottom phases gives:

$$\Sigma_I=2 \cos \tfrac{1}{2}(\Phi^T+\Phi^B)\cos \tfrac{1}{2}(\Phi^T-\Phi^B)=2 \cos \Phi_R \cos(\Phi_G+\Phi_M)$$

$$\Sigma_Q=2 \sin \tfrac{1}{2}(\Phi^T+\Phi^B)\cos \tfrac{1}{2}(\Phi^T-\Phi^B)=2 \sin \Phi_R \cos(\Phi_G+\Phi_M)$$

By forming the sum of the squares of the I and Q components above, the rotation contribution is removed, leaving $$(\Sigma_I)^2+(\Sigma_Q)^2=4 \cos^2(\Phi_G+\Phi_M)=2[1+\cos(2\Phi_G+2\Phi_M)].$$

A simple filtration will remove the DC component, leaving

Filtered sum channel=$2 \cos(2\Phi_G+2\Phi_M),$ which contains only the message phase and the gravity sweep.

In the preferred implementation, the filtered signal above is further processed to separate the message signal from the gravity sweep. To perform the separation, the processor mixes the signal with a locally generated signal from a voltage-controlled oscillator (VCO).

The VCO generates a frequency sweep that is a close match to the gravity sweep. By mixing with both the cosine and sine of the VCO phase, in-phase and quadrature components are created:

In-phase=$\cos \Phi_{VCO}(t)2 \cos[2\Phi_G(t)+2\Phi_M(t)]=\cos[2\Phi_G(t)+2\Phi_M(t)+\Phi_{VCO}(t)]+\cos[2\Phi_G(t)+2\Phi_M(t)-\Phi_{VCO}(t)]$ Quadrature=$\sin \Phi_{VCO}(t)2 \cos[2\Phi_G(t)+2\Phi_M(t)]=\sin[2\Phi_G(t)+2\Phi_M(t)+\Phi_{VCO}(t)]+\sin[2\Phi_G(t)+2\Phi_M(t)-\Phi_{VCO}(t)]$ The VCO phase is a close match to the gravity phase, so $\Phi_{VCO}(t)=2\Phi_G(t)$. Therefore:

In-phase=$\cos[4\Phi_G(t)+2\Phi_M(t)]+\cos[2\Phi_M(t)],$

Quadrature=$\sin[4\Phi_G(t)+2\Phi_M(t)]+\sin[2\Phi_M(t)].$

The message frequency in the second term can be separated from the sum frequency in the first term by filtering, provided that the sum frequency is greatly different from the message frequency. The region of interest for the message frequency lies below 20 kHz. The gravity sweep, on the other hand, increases linearly with time, and at the preferred optical wavelengths, will exceed 20 kHz within a few milliseconds. By withholding data collection until after the gravity sweep frequency passes out of range of the message term, a sufficient difference is guaranteed. After filtering, what remains is:

In-phase=$\cos[2\Phi_M(t)],$

Quadrature=$\sin[2\Phi_M(t)].$

Figure 9:
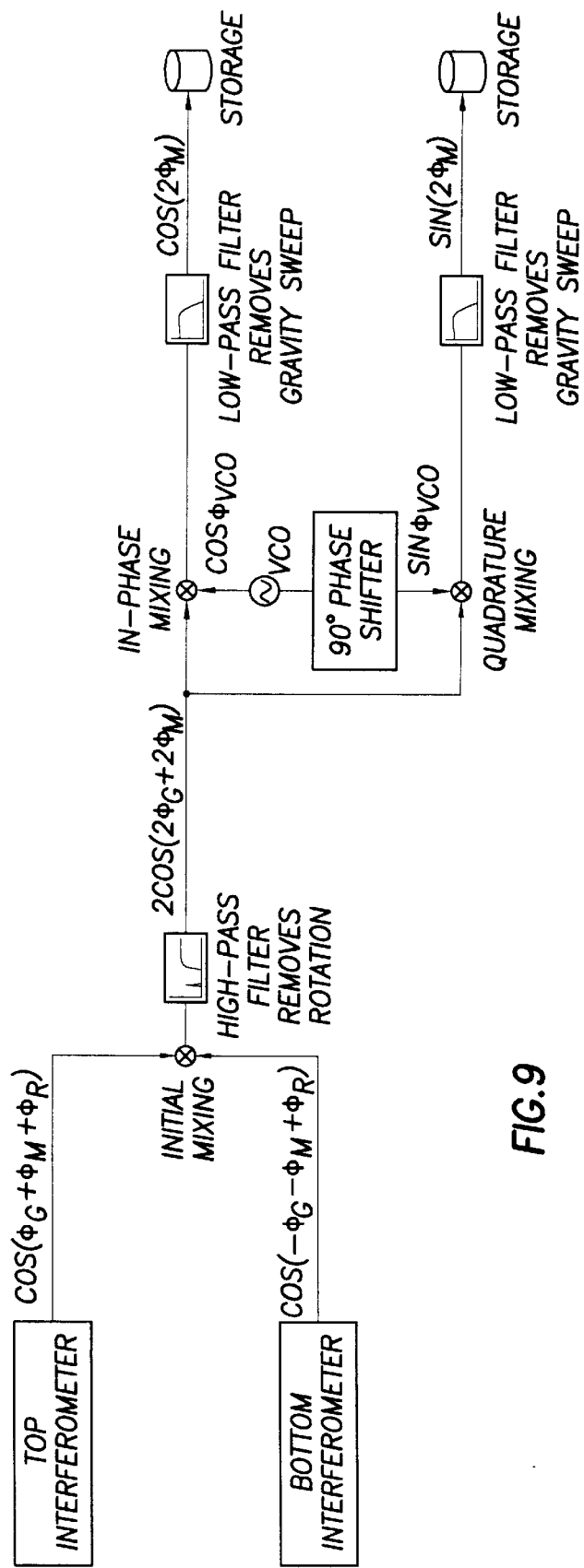
FIG. 9 is shows a second implementation of signal processing.

Many variations of the method of signal processing are possible. One of these is that the interference signals from the detectors might be digitized directly, with subsequent processing being performed digitally. Another is that the corruption due to reflector rotation could be removed by a different method. For example, instead of forming a sum channel as described above the top and bottom data signals could be directly mixed with each other as illustrated in FIG. 9:

mixed signal=$\cos \Phi^T(t)\cos \Phi^B(t) =\tfrac{1}{2} \cos[\Phi^T(t)-\Phi^B(t)]$ $+\tfrac{1}{2} \cos[\Phi^T(t)+\Phi^B(t)]$ $=\tfrac{1}{2} \cos[2\Phi_G(t)+2\Phi_M(t)]+\tfrac{1}{2} \cos[2\Phi_R(t)]$ The final term is the only one containing rotation. It can be separated from the message frequency and the gravity sweep by filtering, provided that the frequencies of the two terms are greatly different. Unless the reflector is severely deformed or is rotating at a very high rate, the rotation frequency can be expected to be well below 500 Hz. The gravity sweep, on the other hand, increases linearly with time, and at the preferred optical wavelengths, will exceed 20 kHz within a few milliseconds. By withholding data collection until after the gravity sweep frequency passes out of range of the rotation term, a sufficient difference is guaranteed. The rotation term can then be removed with a high-pass filter, leaving the following:

post mixing, filtered signal=$\tfrac{1}{2} \cos[2\Phi_G(t)+2\Phi_M(t)].$

From this point, the removal of the gravity sweep can be accomplished using a VCO as described in the preferred implementation described above.

Another signal processing variation is to mix the top with bottom, but carry it out after mixing with the VCO signal. In that case, the top and bottom mixed signals would be:

Top=$\cos \Phi_{VCO}(t)\cos[\Phi_G(t)+\Phi_M(t)+\Phi_R(t)]=\tfrac{1}{2} \cos[\Phi_G(t)+\Phi_M(t)+\Phi_R(t)+\Phi_{VCO}(t)]$ $+\tfrac{1}{2} \cos[\Phi_G(t)+\Phi_M(t)+\Phi_R(t)-\Phi_{VCO}(t)]$ Bottom=$\cos \Phi_{VCO}(t)\cos[-\Phi_G(t)-\Phi_M(t)+\Phi_R(t)]=\tfrac{1}{2} \cos[-\Phi_G(t)-\Phi_M(t)+\Phi_R(t)+\Phi_{VCO}(t)]$ $+\tfrac{1}{2} \cos[-\Phi_G(t)-\Phi_M(t)+\Phi_R(t)-\Phi_{VCO}(t)]$ The VCO phase is a close match to the gravity phase, so $\Phi_{VCO}(t)=\Phi_G(t)$. Therefore:

Top=½ cos[2$\Phi_G(t)+\Phi_M(t)+\Phi_R(t)$]+½ cos[$\Phi_M(t)+\Phi_R(t)$],

Bottom=½ cos[$-2\Phi_G(t)-\Phi_M(t)+\Phi_R(t)$]+½ cos[$-\Phi_M(t)+\Phi_R(t)$].

The message and rotation frequencies in the second term can be separated from the sum frequency in the first term by filtering, provided that the first term frequency is greatly different from second term. As long as the reflector is not severely deformed, the rotation frequency is small. Furthermore, the region of interest for the message frequency lies below 20 kHz. Since the gravity frequency rapidly rises above 20 kHz, a brief delay prior to data collection will guarantee a sufficient frequency difference.

After the gravity portion is filtered out, what remains is:

Top=½ cos[$\Phi_M(t)+\Phi_R(t)$],

Bottom=½ cos[$-\Phi_M(t)+\Phi_R(t)$].

The removal of the rotation component, might be achieved by mixing of the above top signal with the bottom signal:

mixed signal=(Top)(Bottom) =½ cos[$\Phi_M(t)+\Phi_R(t)$]½ cos[$-\Phi_M(t)+\Phi_R(t)$]=⅛ cos[$2\Phi_M(t)$]+⅛ cos[$2\Phi_R(t)$]

The final term is the only one containing rotation. It may be possible to remove it by filtering, but such removal would be problematic if the rotation frequency intrudes upon the message frequency band. Such intrusion is likely if rotation is a significant source of signal corruption.

Operation of the geophone device described herein is simple. It is first attached to the earth's surface so that its motion will be tightly coupled to the ground's acoustic vibration. This may be done using spike 70 of FIG. 3 or spike 170 of FIG. 7. Other methods for coupling may be used. Then, when measurements are to begin, the laser and detectors are activated. The reference body is released. During the fall, the reference body is de-coupled from the rest of the device and is no longer mechanically coupled to the earth's surface. The beam-splitters at top and bottom direct one beam each straight to the detector, and the other one to the falling body, where it is reflected back and interferes with the first beam. The detectors collect the interference signals generated, separating the message portion (that caused by device vibration) from the linear frequency sweep caused by the reflector's acceleration under gravity and from other frequencies possibly introduced by rotation of the reflector.

If the effects of reflector rotation can be kept at tolerable levels, then optical components need not be provided at top and bottom of the apparatus. The placement of optics at both ends is driven by the need to compensate for rotation.

The reflector, 50 or 150 in the figures, need not necessarily be trihedral. If out-of-plane motion can, by some means, be kept to a tolerable level, then a dihedral, or perhaps even simpler, reflector geometry may be used.

The fall of the reflector, 50 or 150 in the figures, may be constrained. Lateral constraint will prevent reflector motion in lateral directions from shifting the returning beam, $B_i$, away from the transiting beam, $C_i$. Rotational constraint will prevent corruption of the signal by reflector rotation. Lateral and rotational constraints might be imposed together, such as if the reflector is fixed on a carriage that rides vertical rails.

More than one laser may be used. The top and bottom optical arrangements might include separate lasers instead of the single laser used in the preferred embodiment.

Although the present invention has been described with reference to specific details, it is not intended that such details should be regarded as limitations upon the scope of the invention, except as and to the extent that they are included in the accompanying claims.

What we claim is:

1. Apparatus for measuring movement of a surface, comprising:
   a chamber;
   a mass, the mass having a top and a bottom reflecting surface;
   a support for the mass, the support being adapted to release the mass for free fall within the chamber;
   a light source;
   optical components to direct a beam from the light source to the top and the bottom reflecting surface of the mass and to bring a reflected beam to a common point with a reference beam to form a top and a bottom interferometer beam; and
   a first top and a first bottom photodetector disposed so as to measure the top and the bottom interferometer beam.

2. The apparatus of claim 1 wherein the chamber is evacuated to produce a vacuum therein.

3. The apparatus of claim 1 wherein the top and the bottom reflecting surface of the mass includes an interior angle and the interior angle is equal to 90 degrees.

4. The apparatus of claim 1 wherein the top and the bottom reflecting surface of the mass is a trihedral retroreflector.

5. The apparatus of claim 1 wherein the mass is made up primarily of MYLAR.

6. The apparatus of claim 1 wherein the support includes a solenoid coil and a controller for controlling electrical current in the coil, a plurality of permanent magnets, the magnets being attached to a carriage, the carriage being adapted for moving within the chamber and raising the mass therein.

7. The apparatus of claim 1 wherein the support is a mechanical carriage.

8. The apparatus of claim 1 wherein the light source is a laser.

9. The apparatus of claim 1 wherein the optical components include a beam-splitter and prisms, the prisms having partially reflecting surfaces.

10. The apparatus of claim 9 further comprising a second top photodetector and a second bottom photodetected disposed so as to measure the top and the bottom interferometer beam.

11. The apparatus of claim 1 wherein the optical components include a beam-splitter and partially reflecting mirrors.

12. The apparatus of claim 1 wherein the top and the bottom photodetector are avalanche photodiodes.

13. A method for measuring movement of a surface, comprising:
   providing a chamber, the chamber being responsive to movement of the surface;
   providing a mass and placing the mass within the chamber, the mass having a top and a bottom reflecting surface;
   supporting the mass until a selected time, then releasing the mass for free fall within the chamber;
   providing a light source and optical components to direct a beam from the light source to the top and the bottom reflecting surface of the mass during free-fall and to bring a reflected beam to a common point with a reference beam to form a top and a bottom interferometer beam; and measuring the top and the bottom interferometer beam.

14. The method of claim 13 further comprising the step of evacuating the chamber to produce a vacuum therein.

15. The method of claim 13 wherein the top and the bottom reflecting surface of the mass includes an interior angle and the interior angle is equal to 90 degrees.

16. The method of claim 13 wherein the top and the bottom reflecting surface of the mass is a trihedral retroreflector.

17. The method of claim 13 wherein the step of supporting and releasing the mass includes changing electrical current flow in a solenoid coil.

18. The method of claim 13 wherein the step of supporting and releasing the mass includes manipulating a mechanical carriage.

19. A method for processing a signal from a top and a signal from a bottom interferometer receiving light rays reflected from a top reflecting surface and a bottom reflecting surface of a free-falling mass and a reference beam moving with a vibrating surface to measure a movement of the vibrating surface, comprising:

(a) reading the signal from the top and the signal from the bottom interferometers for a selected interval of time during free fall of the mass;

(b) forming an in-phase and a quadrature component of the signal from the top and the bottom interferometers;

(c) summing the in-phase and the quadrature component of the signals from the top and the bottom interferometers;

(d) forming a sum-of-the-squares of the in-phase and quadrature components;

(e) filtering the sum-of-the-squares to remove a DC component to form a filtered sum channel;

(f) providing a signal from a voltage-controlled oscillator and mixing the filtered sum channel with a sine and a cosine output of the voltage-controlled oscillator, the sine and cosine outputs being closely matched to a gravity sweep, to form an in-phase and a quadrature component; and (g) filtering the in-phase and the quadrature component to form a sine and a cosine function of the movement of the vibrating surface.

* * * * *